United States Patent [19]

Yoshinaka

[11] 4,145,705

[45] Mar. 20, 1979

[54] TIME BASE CORRECTION OF COLOR VIDEO SIGNAL FROM PLAYBACK APPARATUS

[75] Inventor: Tadaaki Yoshinaka, Yokohama, Japan

[73] Assignee: Sony Corporation, Tokyo, Japan

[21] Appl. No.: 838,865

[22] Filed: Oct. 3, 1977

[30] Foreign Application Priority Data

Oct. 8, 1976 [JP] Japan .................. 51-120965

[51] Int. Cl.² .................. H04N 5/76; H04N 9/46
[52] U.S. Cl. .................. 358/8; 358/19
[58] Field of Search .................. 358/4, 8, 19

[56] References Cited

U.S. PATENT DOCUMENTS

| | | | |
|---|---|---|---|
| 4,057,826 | 11/1977 | Baker | 358/8 X |
| 4,062,041 | 12/1977 | Tallent et al. | 358/8 |
| 4,063,279 | 12/1977 | Vidovic et al. | 358/8 X |

OTHER PUBLICATIONS

Sanders; "Digital Time Base Correction of Video Tape Recorders," Proc. IEEE, Apr. 1976, pp. 118–123.

Primary Examiner—Robert L. Griffin
Assistant Examiner—Aristotelis M. Psitos
Attorney, Agent, or Firm—Lewis H. Eslinger; Alvin Sinderbrand

[57] ABSTRACT

A playback apparatus for reproducing a composite color video signal from a recorded signal of the "color-under" type and having a heterodyne circuit which, in response to a carrier reference signal, frequency reconverts the chrominance component of the reproduced composite color video signal from the low frequency band in which it was recorded to the standard sub-carrier frequency, is further provided with a phase-lock loop circuit for generating the carrier reference signal in response to horizontal synchronizing signals of the reproduced composite color video signal, a time base correcting circuit receiving the reproduced composite color video signal and the carrier reference signal as a clock signal and being operative to compensate for time-base errors in the reproduced composite color video signal from the playback apparatus, a variable phase-shifter through which the carrier reference signal is applied to the heterodyne circuit of the playback apparatus, and a phase comparator for controlling the phase-shifter on the basis of comparison of the phase of color burst signals from the reproduced composite color video signal with the phase of the carrier reference signal from the phase-lock loop circuit.

14 Claims, 4 Drawing Figures

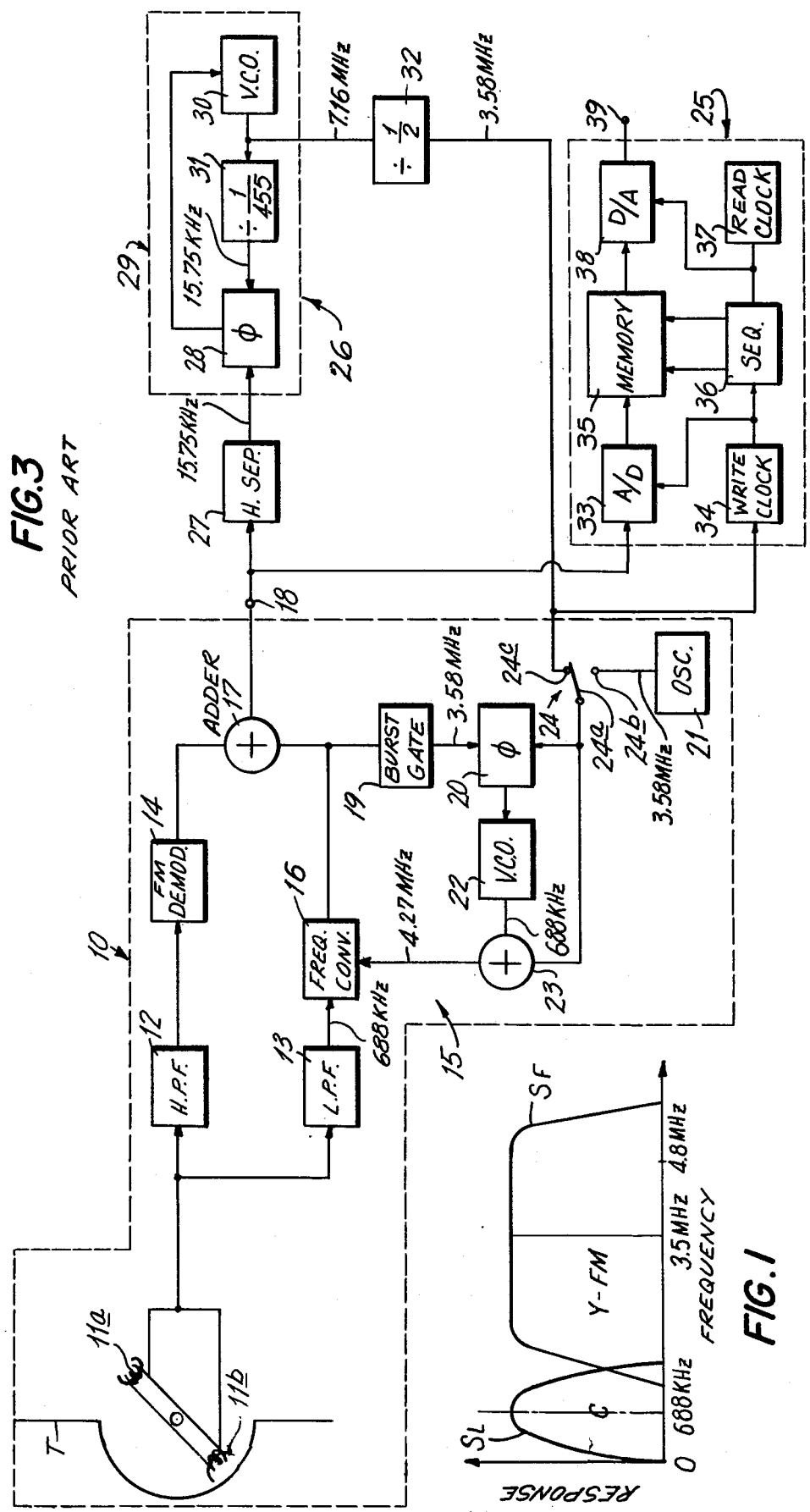

TIME BASE CORRECTION OF COLOR VIDEO SIGNAL FROM PLAYBACK APPARATUS

BACKGROUND OF THE INVENTION

1. Field of the Invention

This invention relates generally to the playback of recorded color video signals and, more particularly, is directed to improvements in the playback or reproducing of recorded color video signals of the "color-under" type with compensation being provided for time base errors appearing therein.

2. Description of the Prior Art color-under"chrominance

Due to the relatively low writing speed and, consequently, the relatively small recording band-width of the popular inexpensive helical-scan video tape recorders (YTRs), direct color recording is not possible therewith and the so-called "heterodyne" or "color-under " arrangement is employed for recording and reproducing color video signals by means of such VTRs. Thus, in the recording operation of a typical helical-scan VTR, a composite color video signal is separated into its chominance and luminance components, whereupon, the luminance component is employed to frequency modulate a carrier, while the chrominance component is frequency-converted from the standard sub-carrier frequency to a relatively low frequency band below that of the frequency-modulated luminance component. The frequency modulated luminance component and the down-converted chrominance component are recombined for recording in parallel tracks extending obliquely across a magnetic tape and being successively scanned by a pair of magnetic recording heads which are rotated, for example, at a speed of 30 revolutions per second, so as to record one field of video signal information in each track.

After the tape has been recorded, the recorded composite color video signal may be reproduced by the rotary heads of a compatible video signal reproducing or playback apparatus. In many instances, the video signal playback apparatus may be constituted by a playback or reproducing section of the video tape recorder (VTR) which was originally employed for recording the color video signal. However, as frequently occurs, the apparatus used for playback or reproducing of the recorded composite color video signal may be different from the apparatus used for the recording thereof. Although servo systems generally are provided to control the rotary movements of the magnetic heads and the linear movement of the tape during the recording and reproducing operations, fluctuations may nevertheless occur in the rotary speed of the magnetic heads and/or in the linear speed of the tape during recording and playback or reproducing of the composite color video signal. Further, dimensional changes may occur in the magnetic tape, for example, as a result of tape shrinkage or stretching, after the recording operation. All of the foregoing possible variations may result in errors in the frequency and phase of the reproduced composite color video signal. Such frequency and phase errors, known as time-base errors, cause undesirable observable effects, such as, jitter, brightness distortion and improper color display, in the ultimately reproduced color video picture. It is particularly important that the time-base errors be corrected in a reproduced composite color video signal if the latter is to be transmitted as a portion of a television broadcast.

Time base correctors (TBCs) that have been developed to remove or compensate for time base errors introduced in video or other information signals by the recording and/or reproducing thereof. In such time base correctors, successive line or other intervals of the reproduced color video signal are written in a memory at a clocking rate which varies generally in accordance with the time base errors, and then the color video signal is read out of the memory at a standard clocking rate so as to be substantially free of time base errors, for example, as disclosed in detail in U.S. Pat. No. 3,860,952.

When the recorded composite color video signal is of the "color-under" type, that is, has its chrominance component down-converted from a standard sub-carrier frequency, such as, 3.58 MHz in the case of an NTSC signal, to a relatively low frequency band below that in which the luminance component is recorded, for example, as a frequency modulation of a suitable carrier, the reproducing or playback apparatus for such recorded composite color video signal includes a so-called "heterodyne" circuit in which the chrominance component of the reproduced signal is heterodyned back up to the standard chrominance sub-carrier frequency. However, the process of frequency converting the chrominance component to a low carrier frequency, such as, for example, 688 KHz, for recording of the composite color video signal, and then frequency reconverting the chrominance component of the reproduced signal back up to the standard sub-carrier frequency of, for example, 3.58 MHz, destroys the phase-coherence between the horizontal synchronizing signal and the color burst signal and this gives rise to difficulties in effecting time base correction of the reproduced composite color video signal.

If the clocking rate at which intervals of the reproduced color video signal are written in the memory of the time base corrector is established by an "artificial" off-tape sub-carrier produced in the time base corrector only from the horizontal synchronizing signal of the reproduced composite color video signal, the problem of phase-incoherence is resolved, but the time base correction is only imperfectly effected as the color burst signal providing more precise information as to time base errors is not utilized. In view of the foregoing, it has been proposed to use the so-called "two-wire" approach in which the artificially derived off-tape sub-carrier or carrier reference signal obtained from the horizontal synchronizing signal of the reproduced composite color video signal and determining the clocking rate for writing in the time base corrector is also fed back to the heterodyne circuit or processor of the playback apparatus for eliminating the phase incoherence. More particularly, in the mentioned "two-wire" arrangement, the heterodyne processor of the playback apparatus includes an automatic phase-control (APC) loop which receives the artificially derived off-tape sub-carrier and provides a frequency reconverting signal applied to a frequency converter by which the chrominance component of the reproduced signal is heterodyned back up to the standard chrominance sub-carrier frequency. However, by reason of the limited loop gain of the APC loop in the playback apparatus, and further by reason of the fact that the loop gain of the APC loop may vary from one playback apparatus to the next, the color burst in the reproduced composite color video signal obtained at the output of the playback apparatus may not coincide fully with the artificially derived off-tape sub-carrier developed in the time base corrector. Thus, the existing "two-wire" system or arrangement may not reliably achieve good time base correction or compensation, particularly when the time base corrector is provided as a component for use with various VTRs or playback apparatuses.

OBJECTS AND SUMMARY OF THE INVENTION

Accordingly, it is an object of this invention to provide an improved arrangement for correcting or compensating for time base errors in a color video signal particularly when the latter has been recorded and reproduced with a so-called "heterodyne" or "color-under" arrangement.

More specifically, it is an object of this invention to cause the color burst contained in a composite color video signal obtained at the output of a playback apparatus having a heterodyne processor to coincide with an artificially derived off-tape sub-carrier developed in an associated time base corrector and being fed back to fthe heterodyne processor for determining the frequency reconverting signal in the latter.

In accordance with an aspect of this invention, the artificially derived off-tape sub-carrier developed in the time base corrector to establish the clocking rate for writing in the latter is also applied to the heterodyne circuit or processor of the playback apparatus through a variable phase-shifter which is controlled by a control signal or voltage from a phase comparator comparing the phase of the color burst signal in the reproduced composite color video signal at the output of the playback apparatus with the phase of the off-tape sub-carrier or carrier reference signal developed within the time base corrector.

The above, and other objects, features and advantages of the invention, will be apparent in the following detailed description of an illustrative embodiment which is to be read in connection with the accompanying drawings.

BRIEF DESCRIPTION OF THE DRAWINGS

FIG. 1 diagramatically illustrates the frequency spectrum of a recorded color video signal of the "color-under" type which is to be reproduced in accordance with this invention;

FIG. 3 is a block diagram illustrating a known arrangement of a playback apparatus with a time base corrector and a circuit for providing an artificially derived off-tape sub-carrier for the time base corrector and which may also be fed back to the heterodyne processor of the playback apparatus in a "two-wire" arrangement according to the prior art.

DESCRIPTION OF A PREFERRED EMBODIMENT

Figure 4:
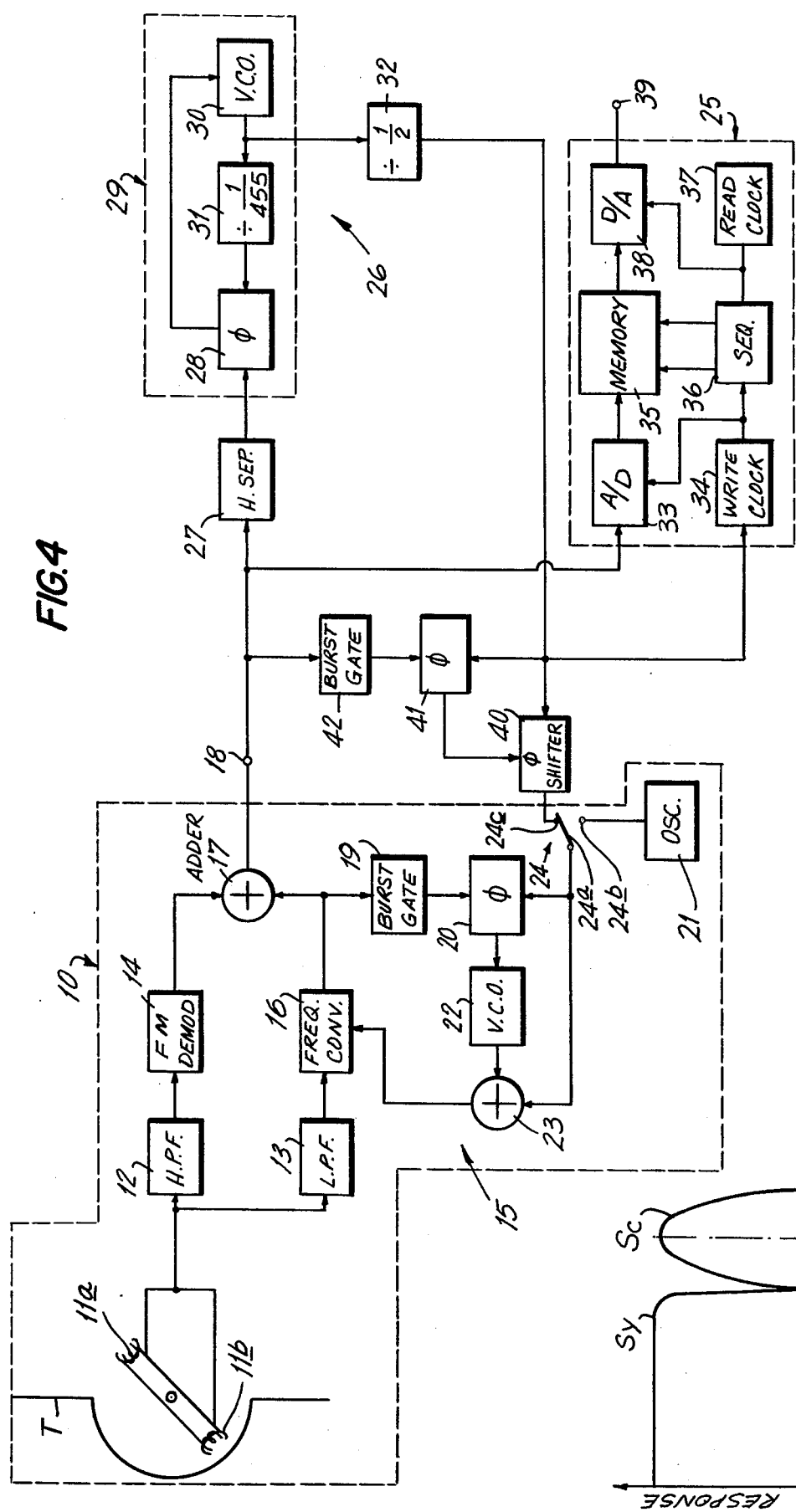
FIG. 4 is a block diagram similar to that of FIG. 3, but showing a circuit arrangement according to an embodiment of this invention.

Referring to the drawings in detail, and initially to FIG. 1 thereof, it will be seen that a recorded composite color video signal which may be reproduced in accordance with this invention is of the "color-under" type in that the recorded color video signal includes a frequency modulated luminance component $S_F$, for example, having a center frequency of 3.5MHz, and a chrominance component $S_L$ which has been down-converted from a standard sub-carrier frequency, for example, of 3.58MHz in the case of a NTSC signal, to a relatively low sub-carrier frequency, for example, of 688KHz, so as to be in a frequency band substantially below that of the recorded frequency modulated luminance component. Also included in the recorded composite color video signal are the usual vertical and horizontal synchronizing and color burst signals. Such composite color video signal of the "color-under" type, as shown on FIG. 1, may be recorded by a conventional helical-scan VTR in parallel tracks extending obliquely across a magnetic tape T with one field of video signal information being recorded in each of the successive tracks.

After the tape T has been recorded, the recorded composite color video signal may be reproduced by a compatible video signal reproducing or playback apparatus 10 (FIG. 3) which may be constituted by a playback or reproducing section of the VTR originally employed for recording the color video signal. Whether the playback apparatus 10 is separate from, or a part of the VTR employed for recording the color video signal, such apparatus may include a pair of magnetic heads 11a and 11b which are suitably rotated so as to alternately scan and reproduce the color video signals recorded in the successive oblique tracks on tape T as the latter is being suitably driven in the longitudinal direction.

Figure 2:
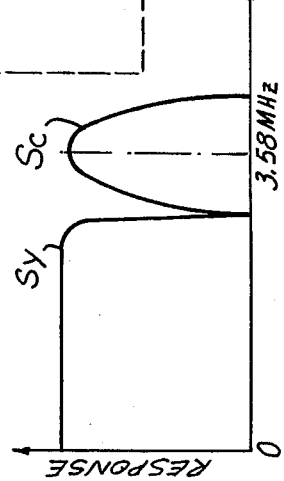
FIG. 2 is a view similar to that of FIG. 1, but showing the reproduced composite color video signal after the same has been processed in a playback apparatus having a heterodyne processor or circuit.

The composite color video signals reproduced from tape T by rotary heads 11a and 11b are conventionally applied to a luminance separator 12 and a chrominance separator 13. The luminance separator 12 may be constituted by a high pass filter adapted to transmit the frequency band of the frequency modulated luminance component $S_F$ (FIG. 1). The output of high pass filter 12, that is, the frequency modulated luminance component, is applied to a frequency demodulator 14 by which the original luminance component $S_Y$ (FIG. 2) of the color video signal is obtained. The chrominance separator 13 may be constituted by a low pass filter adapted to transmit the frequency band of the down-converted chrominance $S_L$ (FIG. 1). The down-converted chrominance component passing through filter 13 is applied to a heterodyne circuit or processor 15 of playback apparatus 10 in which the chrominance component of the reproduced signal is heterodyned back up to the standard chrominance sub-carrier frequency. More particularly, in the conventional playback apparatus 10 of FIG. 3, the heterodyne processor 15 is shown to include a frequency converter 16 in which the output of low pass filter 13 is acted upon by a frequency reconverting signal which is effective to convert the sub-carrier of the recorded chrominance component back to the original frequency or standard sub-carrier frequency. As an example, if the down-converted chrominance component of the recorded signal has a sub-carrier frequency of approximately 688KHz, the frequency reconverting signal applied to frequency converter 16 may have a frequency of approximately 4.27MHz so as to be effective in converter 16 to convert the sub-carrier of the reproduced chrominance component from the frequency of 688KHz back to the standard frequency of 3.58MHz. The demodulated luminance component from demodulator 14 and the frequency reconverted chrominance component from converter 16 are applied to an adding or mixing circuit 17 which provides the reproduced composite color video signal at an output terminal 18 of playback apparatus 10.

In order to provide the frequency reconverting signal to converter 16, the heterodyne processor 15 of apparatus 10 is further shown to typically include a phase-locked loop formed of a burst gate 19, a phase comparator 20, a local oscillator or external reference signal source 21, a voltage-controlled oscillator (VCO) 22 and a frequency converter or mixing circuit 23. Burst gate circuit 19 is connected to the output of frequency converter 16 so as to transmit the color burst signal which is present at the start of each horizontal line interval in the frequency reconverted chrominance component. As is conventional, the burst signal frequency is equal to that of the sub-carrier upon which the chrominance information is modulated. Thus, in the example being described with reference to FIG. 3, each color burst signal applied through gate 19 to one input of phase comparator 20 has a frequency of approximately 3.58MHz, while another input of phase comparator 20 is connected to a movable contact 24a of a switch 24 so as to be coupled to local oscillator 21 when movable contact 24a engages a fixed contact 24b of switch 24. Phase comparator 20 operates to compare the phase of the burst signal from gate 19 with the constant phase of the 3.58MHz reference signal or oscillation provided by local oscillator 21. Phase comparator 20 generates an error signal proportional to any detected phase difference between the signals applied to its inputs, and such error signal is applied as a control voltage to VCO 22 for determining the frequency of the oscillation from the latter. As an example, in the case where the down-converted chrominance component of the recorded color video signal has a carrier frequency of 688KHz and is to be reconverted to the standard sub-carrier frequency of 3.58MHz, the output of VCO 22 has a central frequency of 688KHz and is applied to one input of frequency converting or mixing circuit 23, while another input of circuit 23 receives the reference or local oscillation signal with the frequency 3.58MHz. The upper sideband of the mixed outputs of local oscillator 21 and VCO 22, which upper sideband has a frequency of about 4.27MHz (3.58MHz + 0.688MHz), is applied as the frequency reconverting signal to frequency converter 16. It will be seen that, in response to any phase difference between the burst signal from gate 19 and the local oscillating or reference signal from oscillator 21, phase comparator 20 controls VCO 22 accordingly so as to vary the center frequency of the output from VCO 22 and thereby provide an automatic phase conrol (APC) loop for the reconverting signal applied to frequency converter 16.

Although servo systems may be provided to control the rotary movements of heads 11a and 11b and the linear movement of tape T during the recording and reproducing operations, fluctuations may still occur in the rotary speed of the heads and/or in the linear speed of the tape so that such speeds are not identical for the recording and playback operations. Further, dimensional changes may occur in the magnetic tape, for example, as a result of tape shrinkage or stretching, after the recording operation. By reason of the foregoing possible variations, frequency and phase errors, known as time-base errors, may occur in the reproduced composite color video signal appearing at output terminal 18 of playback apparatus 10.

In order to remove or eliminate such time-base errors, the arrangement according to the prior art, as shown on FIG. 3, further comprises a time base corrector 25 having an associated circuit 26 for generating an off-tape sub-carrier or carrier reference signal which contains the time base errors of the reproduced composite color video signal so as to be usable as a clock actuating signal in time base corrector 25. More particularly, the circuit 26 is shown to include a horizontal synchronizing signal separator 27 which separates the horizontal synchronizing signal from the reproduced composite color video signal obtained at output terminal 18. The horizontal synchronizing signal having a frequency of, for example, 15.75KHz, is applied to one input of a phase comparator 28 forming part of a phase-locked loop circuit 29 which further includes a voltage controlled oscillator 30 and a frequency divider 31. In the case where an NTSC color video signal is being processed, voltage controlled oscillator 30 may have a center frequency of 7.16MHz while frequency divider 31 receives the oscillation output of VCO 30 and frequency divides the same by 455 so that divider 31 provides an output with a frequency 15.75KHz when the output of VCO 30 is at the center frequency of the latter. The output of frequency divider 31 is applied to another input of phase comparator 28 which compares the same with the separated horizontal synchronizing signal from separator 27 and, in response to a phase differential therebetween, applies a suitable control voltage to VCO 30 for correspondingly adjusting the output of the latter. Further, as shown, the output of VCO 30 is applied to a frequency divider 32 effective to divide the same by 2 and thereby provide an output of approximately the standard sub-carrier frequency of 3.58MHz which is applied to a fixed contact 24c of switch 24 and also to a clock actuating signal input of time base corrector 25. It will be apparent that the output of frequency divider 32, which constitutes the previously mentioned carrier reference signal generated by circuit 26, will contain the time base errors of the reproduced composite color video signal as represented by the horizontal synchronizing signal from separator 27.

In the prior art arrangement of FIG. 3, time base corrector 25 is shown to include an analog to digital or A-D converter 33 which receives the reproduced composite color video signal from output terminal 18 of playback apparatus 10, and a write clock generator 34 which receives the off-tape sub-carrier from frequency divider 32 and produces write clock pulses having a relatively high frequency, for example, of about 10.7MHz, which is three times the standard color sub-carrier frequency for NTSC signals and also three times the frequency of the output of divider 32. The write clock pulses having a frequency of approximately 10.7MHz are applied from generator 34 to A-D converter 33 to control the rate at which the latter samples the reproduced composite color video signal from output terminal 18 and converts the same from its original analog form into digital form. The write clock pulses from generator 34, having a frequency which is varied with time base errors in the reproduced video signal, further control or determine the rate at which the sampled video signal in digitized form is written from converter 33 in a digital memory 35. As is known, for example, as specifically disclosed in U.S. Pat. application Ser. No. 642,197 and now U.S. Pat. No. 4,063,284, having a common assignee herewith, digital memory 35 may be composed of a number of register units in which the digitized video signal information is written in a sequence determined by a sequence control 36 which is also activated by the write clock pulses from generator 34. After momentary storage in the register units of memory 35, the digitized video signal information is read out therefrom in a sequence again determined by control 36, but with the reading out of the digitized video signal information from memory 35 being effected at a standard clocking rate as established by a read clock generator 37. The read clock pulses from generator 37 are also applied to a digital to analog or D-A converter 38 which receives the digitized video signal information read out from memory 35 and which is operative to convert the same back to the original analog form, with the resulting color video signal in analog form being applied to an output terminal 39. It will be apparent that, in the time base corrector 25, successive line intervals of the incomming reproduced composite color video signal are written in memory 35 at a clocking rate which varies generally in accordance with the time base errors of the reproduced signal, and that the video signal is read out from memory 35 at a standard clocking rate so that the color video signal obtained at output terminal 39 is substantially free of any time base errors.

It will be noted that, in the prior art arrangement of FIG. 3, when switch 24 is positioned to engage its movable contact 24a with fixed contact 24b, the fixed or local oscillation signal is applied from oscillator 21 to mixing circuit 23 in the heterodyne processor 15 of playback apparatus 10, and the "artificial" off-tape sub-carrier or carrier reference signal obtained from frequency divider 32 for effecting time base correction in time base corrector 25 is derived only from horizontal synchronizing information, that is, the horizontal synchronizing signal from separator 27. The foregoing arrangement provides relatively poor time base correction since the more precise information as to time base errors contained in the color burst signal is not utilized.

However, if switch 25 is changed-over to engage its movable contact 24a with fixed contact 24c, as shown in FIG. 3, a so-called "two-wire" arrangement is obtained in which the artificially derived off-tape sub-carrier from frequency divider 32 is fed back to the heterodyne processor 15 in the VTR or playback apparatus 10. More particularly, in such "two-wire" arrangement, the phase comparator 20 of the APC loop in heterodyne processor 15 compares the artificially derived off-tape sub-carrier from frequency divider 32 with the color burst signal from gate 19 and correspondingly controls the output of voltage controlled oscillator 22. Thus, mixing circuit 23 provides the frequency reconverting signal for frequency reconverter 16 from the output of VCO 22 and from the artifically off-tape sub-carrier. The purpose of the foregoing is to seek to eliminate phase incoherence between the horizontal synchronizing signal and the color burst signal in the reproduced composite color video signal obtained at output terminal 18 of playback apparatus 10. However, by reason of the limited loop gain of the APC loop in playback apparatus 10, and further by reason of the fact that the loop gain of such APC loop may vary from one playback apparatus to the next, the color burst signal in the reproduced composite color video signal obtained at output terminal 18 may not fully coincide with the artificially derived off-tape sub-carrier developed in the time base corrector, that is, provided at the output of frequency divider 32. Thus, the exisiting "two-wire" system or arrangement resulting when switch 24 is in the position shown on FIG. 3 may not reliably achieve good time base correction or compensation, particularly when time base corrector 25 and the associated circuit 26 for providing the artificially derived off-tape sub-carrier are provided as a component for use with various VTRs or playback apparatuses.

Referring now to FIG. 4, in which the various components of the arrangement shown on FIG. 3 are identified by the same reference numerals, it will be seen that the above described problem associated with the known "two-wire" arrangement of FIG. 3 is avoided in accordance with the present invention by providing a variable phase-shifter 40 through which the artificially derived off-tape sub-carrier from frequency divider 32 is applied to contract 24c of switch 24 for application from the latter to phase comparator 20 and mixing circuit 23. In accordance with the invention, variable phase-shifter 40 is controlled by a control signal or voltage from a phase comparator 41 which compares the phase of the off-tape sub-carrier or carrier reference signal from divider 32 with the phase of a continuous sub-carrier signal from a burst gate circuit 42 connected with output terminal 18. The burst gate circuit 42 derives each color burst signal from the reproduced composite color video signal at output terminal 18 and converts the same into a continuous sub-carrier signal for the remainder of the next horizontal interval. Such sub-carrier signal from gate circuit 42 is compared in comparator 41 with the off-tape sub-carrier from divider 32 so as to suitably control variable phase shifter 40. By reason of the foregoing arrangement, the off-tape sub-carrier fed back to the heterodyne processor 15 of playback apparatus 10 through phase shifter 40 and switch 24 is made to coincide with the color burst signal included in the output of playback apparatus 10 and, accordingly, accurate time base correction is simply achieved.

Although a particular embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. The combination of:
    a playback apparatus for reproducing a composite color video signal from a recorded signal of the "color-under" type including luminance and chrominance components and a horizontal synchronizing signal and being recorded with said chrominance component down-converted from a standard sub-carrier frequency to a relatively low frequency band below that in which the luminance component is recorded, said playback apparatus including heterodyne means in which said down-converted chrominance component of the recorded signal is frequency reconverted in response to the application of a carrier reference signal to said heterodyne means for providing the chrominance component of the reproduced composite color video signal with said standard sub-carrier frequency;
    means for generating said carrier reference signal in response to said horizontal synchronizing signal of the reproduced color video signal;
    time base correcting means receiving said reproduced composite color video signal and said carrier reference signal as a clock signal and being operative to compensate for time-base errors in said reproduced composite color video signal from said playback apparatus;

variable phase-shifting means for applying said carrier reference signal to said heterodyne means;

means for deriving a color burst signal from said reproduced composite color video signal; and phase-comparing means for comparing said carrier reference signal with said color burst signal and providing a corresponding control signal to said variable phase-shifting means for determining the phase of said carrier reference signal applied to said heterodyne means.

2. The combination according to claim 1; in which said heterodyne means includes frequency converting means receiving the chrominance component in said relatively low frequency band, a controllable oscillator producing an oscillating signal combined with said carrier reference signal to provide a converting signal which is applied to said frequency converting means for causing the latter to convert the chrominance component to said standard sub-carrier frequency, means for deriving a color burst signal from the output of said frequency converting means, and phase comparing means comparing said carrier-reference signal with the color burst signal derived from the output of said frequency converting means and providing a corresponding control signal to said controllable oscillator for locking said oscillating signal to said color burst signal from the output of said frequency converting means.

3. The combination according to claim 2; in which said means for generating the carrier-reference signal includes horizontal synchronizing separator means for separating said horizontal synchronizing signal from the reproduced composite color video signal, controllable local oscillator means for generating a local reference signal, means for deriving said carrier reference signal from said local reference signal, and phase-lock loop means coupled to said controllable local oscillator means and responsive to each separated horizontal synchronizing signal to lock said local reference signal thereto.

4. The combination according to claim 3; in which said phase-lock loop means includes divide means receiving said local reference signal and frequency-dividing the latter to provide a frequency divided reference signal at the frequency of said horizontal synchronizing signal, and phase-comparing means for comparing said frequency divided reference signal with each separated horizontal synchronizing signal and providing a corresponding control signal to said controllable local oscillator means.

5. The combination according to claim 1; in which said means for generating the carrier reference signal includes horizontal synchronizing separator means for separating said horizontal synchronizing signal from the reproduced composite color video signal, controllable local oscillator means for generating a local reference signal, means for deriving said carrier reference signal from said local reference signal, and phase-lock loop means coupled to said controllable local oscillator means and responsive to each separated horizontal synchronizing signal to lock said local reference signal thereto.

6. The combination according to claim 5; in which said phase-lock loop means includes divider means receiving said local reference signal and frequency-dividing the latter to provide a frequency divided reference signal at the frequency of said horizontal synchronizing signal, and phase-comparing means for comparing said frequency divided reference signal with each separated horizontal synchronizing signal and providing a corresponding control signal to said controllable local oscillator means.

7. The combination according to claim 1; further comprising external oscillator means providing a fixed oscillating signal, and switch means selectively actuable to first and second positions for applying to said heterodyne means said carrier reference signal from said variable phase-shifting means and said fixing oscillating signal, respectively.

8. The combination according to claim 1; in which said time base correcting means includes memory means, input means receiving said reproduced composite color video signal and writing the latter in said memory means at a clocking rate which varies generally in accordance with said carrier reference signal, and output means for reading out the composite color video signal from said memory means substantially at a standard clocking rate.

9. The combination according to claim 8; in which said input means includes converter means for converting the received reproduced composite color video signal from analog to digital form prior to writing thereof in said memory means, and said output means includes converter means for converting the composite color video signal read out of said memory means from digital form back to analog form.

10. The combination according to claim 1; in which said luminance component, as recorded, is a frequency modulated signal; and said playback apparatus includes separating means for separating said down-converted chrominance component and said frequency modulated signal, respectively, from said recorded signal, demodulating means for demodulating the luminance component from the separated frequency modulated signal, and adding means for combining the demodulated luminance component and the frequency reconverted chrominance component from said heterodyne means and providing said reproduced composite color video signal as output from said adding means.

11. The combination according to claim 10; in which the heterodyne means includes frequency converting means receiving the down-converted chrominance component from said separating means, a controllable oscillator producing a relatively low frequency oscillating signal combined with said carrier reference signal to provide a converting signal which is applied to said frequency converting means for causing the latter to convert the chrominance component to said standard sub-carrier frequency, means for deriving a color burst signal from the output of said frequency converting means, and phase comparing means comprising said carrier-reference signal as received from said phase-shifting means with the color burst signal derived from the output of said frequency converting means and providing a corresponding control signal to said controllable oscillator for locking said oscillating signal to said color burst signal from the output of said frequency converting means.

12. The combination according to claim 11; in which said means for generating the carrier-reference signal includes horizontal synchronizing separator means for separating said horizontal synchronizing signal from said output of the adding means, controllable local oscillator means for generating a local reference signal, means for deriving said carrier reference signal from said local reference signal, and phase-lock loop means coupled to said controllable local oscillator means and responsive to each separated horizontal synchronizing signal to lock said local reference signal thereto.

13. The combination according to claim 12; in which said phase-lock loop means includes divider means receiving said local reference signal and frequency dividing the latter to provide a frequency divided reference signal at the frequency of said horizontal synchronizing signal, and phase-comparing means for comparing said frequency divided reference signal with each separated horizontal synchronizing signal and providing a corresponding control signal to said controllable local oscillating means.

14. The combination according to claim 13; in which said means for deriving a color burst signal from the reproduced composite color video signal includes a burst gate connected with said output of the adding means.

* * * * *